US012123383B2

(12) United States Patent
Bjurman

(10) Patent No.: US 12,123,383 B2
(45) Date of Patent: Oct. 22, 2024

(54) FUEL INJECTION SYSTEM AND METHOD

(71) Applicant: VOLVO CONSTRUCTION EQUIPMENT AB, Eskilstuna (SE)

(72) Inventor: Magnus Bjurman, Burträsk (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 18/138,312

(22) Filed: Apr. 24, 2023

(65) Prior Publication Data

US 2023/0392569 A1 Dec. 7, 2023

(30) Foreign Application Priority Data

Jun. 6, 2022 (EP) .................................... 22177396

(51) Int. Cl.
*F02M 61/14* (2006.01)
*F02M 57/06* (2006.01)
*F02D 19/06* (2006.01)

(52) U.S. Cl.
CPC ............ *F02M 61/14* (2013.01); *F02M 57/06* (2013.01); *F02D 19/0644* (2013.01); *F02D 19/0647* (2013.01); *F02D 19/0655* (2013.01)

(58) Field of Classification Search
CPC ............... F02M 61/14; F02M 61/5706; F02M 21/0275; F02M 21/0284; F02D 19/0644; F02D 19/0647; F02D 19/0655; F02B 9/06; F02B 17/005; F02B 23/0657; F02B 23/0663; F02B 69/02
See application file for complete search history.

(56) References Cited

U.S. PATENT DOCUMENTS 9,739,232 B2 8/2017 Borissovskiy
2010/0282871 A1 11/2010 Yoshizumi et al.
2014/0261293 A1 9/2014 Schulz et al.
2014/0299671 A1* 10/2014 Lull .................. F02M 51/0617 239/403
2018/0087446 A1 3/2018 Schulz et al.
2019/0107042 A1 4/2019 Thomassin et al.

FOREIGN PATENT DOCUMENTS

EP 2748446 B1 * 8/2018 ........... F02D 19/061
WO WO-2012000307 A1 * 1/2012 ............. F02B 19/12
WO 2015132459 A1 9/2015

OTHER PUBLICATIONS

Extended European Search Report, EP Application No. 22177396.3, mailed Nov. 8, 2022, 7 pages.

* cited by examiner

*Primary Examiner* — Grant Moubry
(74) *Attorney, Agent, or Firm* — Sage Patent Group

(57) ABSTRACT

The disclosure relates to a fuel injection and combustion system in an internal combustion engine, comprising: a main injector comprising at least one main injector outlet configurable to direct a volume of fuel therethrough; a side injector comprising a side injector outlet configurable to direct a volume of fuel therethrough and in a direction towards the main injector; a glow plug positioned between the main injector and the side injector outlet and configurable to provide an increase in temperature so as to ignite a volume of fuel from the side injector outlet and subsequently a volume of fuel from the at least one main injector outlet. The disclosure further relates to a method for injecting and combusting fuel in an internal combustion engine.

19 Claims, 3 Drawing Sheets

FUEL INJECTION SYSTEM AND METHOD

CROSS REFERENCE TO RELATED APPLICATIONS

This application claims priority to European Patent Application No. 22177396.3 filed on Jun. 6, 2022, the disclosure and content of which is incorporated by reference herein in its entirety.

TECHNICAL FIELD

The present disclosure relates to a fuel injection and combustion system in an internal combustion engine and a method for injecting and combusting fuel in an internal combustion engine.

BACKGROUND ART

Today, the use of petrol or diesel to power vehicles is commonplace, and provides a relatively affordable and time-efficient way to fuel a vehicle. However, we are also becoming increasingly aware that the widespread use of these traditional fuels is having a negative impact on the environment, for example because of pollutants released into the atmosphere when they combust. Further, global supplies of petrol and diesel are becoming scarcer and more difficult to access. Both of these factors are driving the need to provide alternative sources of fuel for vehicles.

One response to this problem is to move towards the use of electrical vehicles that are not reliant on petrol or diesel to run, and therefore avoid the above-mentioned problems. While electrical vehicles represent a viable solution to this problem, they are not without their drawbacks. In particular, even with the most up-to-date technology, the charging of an electrical vehicle takes longer than the time required to fuel a vehicle, and generally electrical vehicles are not able to travel as far on a full charge, or provide productive output for as long a time period, as is possible with a full tank of fuel. Further, although electrical vehicle technology in relation to cars and trucks has benefited from recent technological advances, in other areas such as industrial vehicles and machines, seafaring vessels and aircraft, there remain many problems to be solved if we are to produce a viable electrical alternative. Procuring supply of enough electrical power to a worksite is one such problem faced by users of industrial vehicles and machines, for instance. Further, the use of electrical vehicles presents its own problems and environmental effects. For example, there is currently only limited recycling capability of batteries of electrical vehicles, and the production of such batteries requires the mining of rare earth metals.

The use of alternative combustible fuels provides another potential solution. For example, diffusion combustion of methanol is efficient and cleaner than diesel (e.g. no soot is produced, and levels of produced NOx are lower). Similar advantages may be obtained through use of other fuels such as natural gas (e.g. CNG, LNG or methane), hydrogen, ammonia, or alcohols such as methanol, ethanol, octanol or the like. Alternative fuels can also be used more sustainably, as they are able to be produced as biofuels or as eFuels from renewable energy sources, and they may also have a lower total cost of ownership and have fewer exotic material requirements. Some alternative fuels can also use current fuel infrastructure. However, some alternative fuels are not suited to be used in the more efficient compression ignition engine cycle (e.g. as that of a diesel engine) because the auto-ignition temperature is too high to achieve combustion without additional countermeasures.

One solution to this problem is to additionally use a traditional fuel such as diesel to initiate combustion, but in doing so the disadvantages of using these fuels are not eliminated, plus there is the complication of having to provide the vehicle with two types of fuel. Other solutions are to use an extreme compression ratio, to add ignition improver to the fuel, to preheat the inlet air, to insulate the combustion chamber, to add hot EGR, or to inject directly on to a hot glow plug, etc. However, all of the aforementioned have their own disadvantages, such as complexity, glow plug wear from injected liquid fuel onto the glow plug, reduced engine performance (torque/power/response) caused by reducing the volumetric efficiency from the different heat sustaining measures (insulation, preheating, hot EGR), or the like.

There is therefore a need to for a system that permits injection and combustion of alternative fuels with a setup that avoids these drawbacks.

SUMMARY

It is an object of the present disclosure to mitigate, alleviate or eliminate one or more of the above-identified deficiencies and disadvantages in the prior art and solve at least the above mentioned problem.

According to a first aspect there is provided a fuel injection and combustion system in an internal combustion engine, comprising: a main injector comprising at least one main injector outlet configurable to direct a volume of fuel therethrough; a side injector comprising a side injector outlet configurable to direct a volume of fuel therethrough and in a direction towards the main injector; a glow plug positioned between the main injector and the side injector outlet and configurable to provide an increase in temperature so as to ignite a volume of fuel from the side injector outlet and subsequently a volume of fuel from the at least one main injector outlet.

In use, an injection sequence consists of the side injector directing a volume of fuel through the side injector outlet towards the main injector, and being ignited by the glow plug positioned therebetween. The ignited volume of fuel from the side injector subsequently ignites a volume of fuel provided by the main injector, thereby completing one combustion cycle in an internal combustion engine. In igniting the fuel in this way, the glow plug is used to directly ignite only the fuel from the side injector, and is therefore offered a degree of protection from the fuel from the main injector, thereby reducing wear on the glow plug. It should be noted that the above may form part of a larger injection and combustion sequence, and several other injection and combustion sequences are possible in addition to the above.

According to some embodiments, the side injector is configurable to direct a volume of fuel at the centroid of the main injector. As such, the ignited fuel from the side injector may ignite the fuel from the main injector in a uniform and symmetrical manner, which may be preferable to igniting fuel from the main injector at a side portion thereof.

According to some embodiments, the glow plug is positioned between the main injector and side injector outlet such that the side injector is configurable to direct a volume of fuel directly towards both the main injector and the glow plug. According to some embodiments, a flow axis extends between the centroid of the side injector and the centroid of the main injector, and the flow axis intersects the glow plug. This may assist to ensure that the fuel from the side injector is ignited before it reaches the main injector, where the volume of fuel from the main injector may then be ignited.

According to some embodiments, each of the at least one main injector outlets is configurable to direct a volume of fuel away from the glow plug, such that the glow plug is located outside of the volume of fuel from the main injector. As such, the glow plug may be protected from the stream of fuel being directed from the main injector, thereby reducing wear on the glow plug by reducing or preventing contact between the liquid fuel from the main injector and the glow plug.

According to some embodiments, the glow plug is located closer to the main injector than the side injector. Having the glow plug located further from the side injector may assist to ensure that the fuel from the side injector has transitioned from a liquid to a gaseous or vapour phase once it reaches the glow plug, thereby preventing liquid fuel from reaching the glow plug and reducing wear on the glow plug, and ensuring the vapour is ignited in a region where it is able to subsequently ignite fuel from the main injector.

According to some embodiments, the side injector comprises a plurality of side injector outlets, each configurable to direct a volume of fuel therethrough in the direction towards the main injector, thereby permitting fuel to be injected towards the main injector from a wider angle, which may permit enhanced combustion of the fuel from the main injector.

According to some embodiments, the fuel injected from the main injector and the side injector is the same type of fuel. According to some embodiments, the fuel injected from the main injector and the side injector is one of a natural gas (such as CNG, LNG or methane), hydrogen, ammonia or alcohols such as methanol, ethanol, octanol or the like. As such, the user may be able to use an alternative fuel in the internal combustion engine, and may not need to provide a source of mixed fuel, or multiple fuel sources.

According to some embodiments, the fuel injected from the main injector and the side injector has an auto-ignition temperature of above 300 degrees Celsius.

According to some embodiments, the side injector is configurable to direct a volume of fuel therethrough to form a side injector flow mass, and the main injector is configurable to direct a volume of fuel therethrough to form a main injector flow mass. According to some embodiments, the side injector flow mass and the main injector flow mass at least partially, or fully, overlap. Overlapping of the fuel masses may enable the main injector fuel mass to be ignited by the fuel mass from the side injector.

According to a second aspect there is provided a method for injecting and combusting fuel in an internal combustion engine, comprising: injecting a first volume of fuel from an outlet of a side injector in the direction of a main injector; injecting a second volume of fuel from at least one outlet of the main injector; providing an increase in the temperature of a glow plug positioned between the side injector and the main injector; igniting the first volume of fuel and subsequently igniting the second volume of fuel.

According to some embodiments, the method comprises injecting the second volume of fuel from each of the at least one outlets of the main injector in a direction away from the glow plug so as to avoid contact between the glow plug and the second volume of fuel, and to avoid directly directing the second volume of fuel onto the glow plug, thereby reducing the wear on the glow plug by avoiding liquid fuel being directed directly thereon.

According to some embodiments, the method comprises injecting a pre-injection fuel volume from the side injector prior to injecting the first volume of fuel from the side injector. According to some embodiments, the method comprises igniting the pre-injection fuel volume prior to injecting the first volume of fuel from the side injector, and prior to injecting the second volume of fuel from the main injector. Combustion of the pre-injection fuel volume may provide some residual heat in the vicinity of the main injector and the side injector, thereby facilitating subsequent combustion of fuel from either or both of the main injector and side injector. In some cases, igniting the pre-injection fuel volume (or several thereof) from the side injector may provide sufficient heat to ignite the fuel volume from the main injector without the requirement for combustion from, for example, a fuel mass (e.g. an overlapping fuel mass) from the side injector.

According to some embodiments, the method comprises injecting a pre-injection fuel volume from the main injector prior to injecting the second volume from the main injector. According to some embodiments the method comprises injecting the pre-injection fuel volume from the main injector after igniting the pre-injection fuel volume from the side injector, such that the pre-injection fuel volume from the main injector is ignited by residual heat from the ignited side injector pre-injection fuel volume. This may define an injection sequence that is preferable for some load regions of the internal combustion engine.

According to some embodiments, the pre-injection fuel volume from the side injector or the main injector is a smaller volume than the respective first or second volume, and is in the form of a pre-injection pulse. The pulse of fuel from the side injector may ignite easier than the first volume, and may assist to facilitate combustion of the first volume. The pulse of fuel from the main injector may be permitted to mix with surrounding gas (e.g. air) in the combustion cylinder, which may facilitate cleaner combustion. Here, the first and second fuel volumes are those involved in the standard injection sequence (see that described in relation to FIG. 3A) in which the side injector injects a first volume of fuel directed towards the main injector, the first volume of fuel igniting the fuel from the main injector. A pre-injection fuel volume may be considered to be any fuel volume that is produced by the main or side injector in addition to the first and second fuel volumes, and may be injected prior to the first fuel volume from the side injector, or the second fuel volume from the main injector. A pre-injection fuel volume may be or comprise a lesser fuel volume than the first fuel volume when injected from the side injector, or a lesser fuel volume than the second fuel volume when injected from the main injector. A pre-injection fuel volume from the side injector may simply ignite without causing combustion of the second fuel volume. A pre-injection fuel volume from the main injector may not be ignited as a result of the first fuel volume igniting from the side injector—e.g. be directly ignited by the flame caused by combustion of the first fuel volume.

According to some embodiments, the method comprises injecting a third fuel volume from the main injector, and igniting the third fuel volume.

According to some embodiments, the method comprises injecting the first volume of fuel in the direction of both the main fuel injector and the glow plug positioned therebetween, such that the first volume of fuel is ignited by the glow plug and reaches the main injector in the form of ignited fuel.

Effects and features of the second aspect are to a large extent analogous to those described above in connection with the first aspect. Examples mentioned in relation to the first aspect are largely compatible with the second aspect.

The present disclosure will become apparent from the detailed description given below. The detailed description and specific examples disclose some embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The term "alternative fuel" is to be interpreted as fuels that are not in widespread and common use in internal combustion engines—e.g. not petrol and diesel.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 3A to 3D graphically illustrate fuel injection sequences of a fuel injection and combustion system.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The first aspect of this disclosure shows a fuel injection and combustion system in an internal combustion engine, comprising: a main injector comprising at least one main injector outlet configurable to direct a volume of fuel therethrough; a side injector comprising a side injector outlet configurable to direct a volume of fuel therethrough and in a direction towards the main injector; a glow plug positioned between the main injector and the side injector outlet and configurable to provide an increase in temperature so as to ignite a volume of fuel from the side injector outlet and subsequently a volume of fuel from the at least one main injector outlet.

Figure 1:
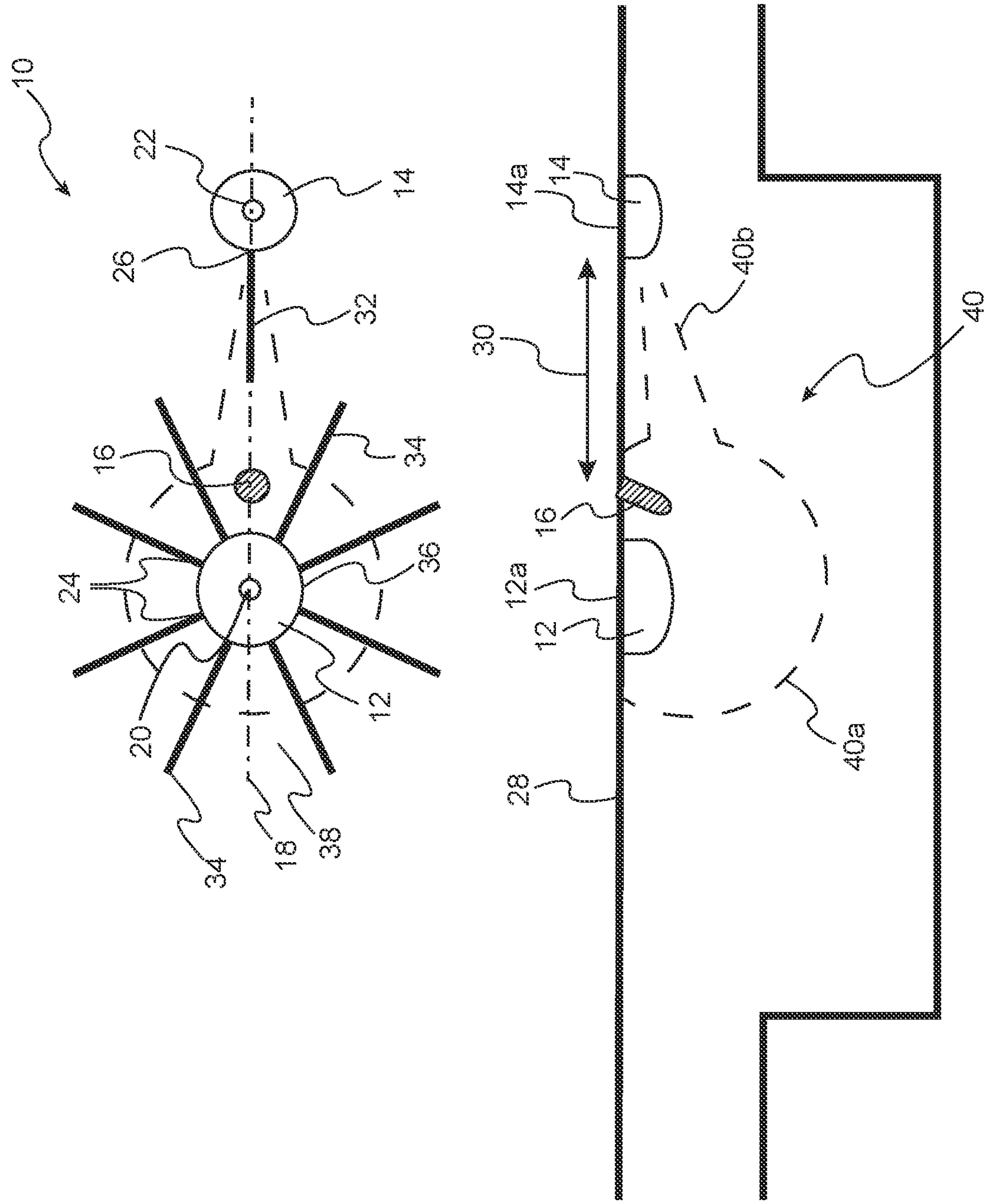
FIG. 1 shows a schematic side and plan view of a fuel injection and combustion system.

FIG. 1 shows schematically a side and a plan view of an example of a fuel injection and combustion system 10. The fuel injection and combustion system is in this example used in a Compression Ignition (CI) engine. The system 10 comprises a main injector 12, and a side injector 14, which is positioned adjacent to (e.g. to the side of) the main injector 12, in this example to the right side of the main injector 12. Both the main injector 12 and the side injector 14 comprise a base 12*a*, 14*a* through which they are mounted to a surface 28 in an internal combustion engine, which in this case is the cylinder head in the internal combustion engine. Located on the main injector 12 and the side injector 14 at the opposite end to the base is a tip.

Between the main injector 12 and the side injector 14 is located a glow plug 16.

Also illustrated in the plan view in FIG. 1 is a flow axis 18, extending in line with the centroid 20 of the main injector 12 and the centroid 22 of the side injector 14. The flow axis 18 may represent a plane that intersects both the main injector 12 and the side injector 14, and runs through the centroids 20, 22 of both, oriented perpendicular to the surface 28. In this example, the glow plug 16 is also intersected by the plane defined by axis 18. Here, the glow plug 16 is symmetrically intersected by the plane defined by the axis 18, and the plane may pass through the centroid of the glow plug 16. In other examples, the glow plug 16 may be positioned such that the plane asymmetrically intersects the glow plug 16. The centroid of the glow plug 16 may be aligned with the flow axis 18, or may be misaligned with the flow axis 18.

The main injector 12 comprises at least one (in this case a plurality of) main injector outlet(s) 24, and the side injector 14 comprises a side injector outlet 26. As illustrated, the glow plug 16 is positioned between the side injector outlet 26 and the main injector 12. The side injector outlet 26 is configured to direct (e.g. flow, inject, spray or the like) a volume of fuel therethrough in the direction of the main injector 12. Here, the side injector outlet 26 is positioned in line with the axis 18 and the plane defined thereby, and the side injector outlet 26 is configured to direct a volume of fuel from the side injector outlet 26 in the direction of the axis 18 towards the main injector 12. In this example, the side injector outlet 26 is configured to direct a volume of fuel from the side injector outlet 26 to the centroid 20 of the main injector 12, e.g. directly towards the main injector 12. As the glow plug 16 is, in this example, also positioned in line with the axis 18, the side injector 14 is configured to direct a volume of fuel directly towards both the glow plug 16 (e.g. the centroid of the glow plug 16) and the main injector 12.

In other examples, the glow plug 16 may be positioned offset from the flow axis 18 (e.g. such that the flow axis 18, and/or the plane defined thereby, intersects the glow plug 16 asymmetrically), in which case the side injector 14 may be configured to direct a volume of fuel towards the main injector 12 and a side portion of the glow plug 16 (e.g. adjacent the centroid of the glow plug 16).

Illustrated in the upper part of FIG. 1 as a line 32 extending from the side injector 14, the method for injecting and combusting fuel comprises directing (e.g. flowing, injecting, spraying or the like) a first volume fuel from the side injector 14 towards the main injector 12 in the direction of the glow plug 16. The glow plug 16 may be operated by flowing a current therethrough, and may be maintained at or above a predetermined temperature, which may be regulated by flowing more or less current through the glow plug 16. As the first volume of fuel is injected from the side injector 14 and moves towards the main injector, it is ignited by the glow plug 16 as the side injector 14 directs a volume of fuel thereto, the glow plug 16 being configured to provide an increase in temperature to the volume of fuel. As such, the side injector 14 and the glow plug 16 may together be considered to be an ignition system, with the glow plug 16 providing a source of heat (either or both due to a current being flowed through the glow plug 16 and/or from heat from a previous combustion cycle) and the side injector providing fuel to be ignited. The first volume of fuel may be directed from the side injector 14 in the form of liquid fuel (e.g. may pass through the side injector outlet 26 in the form of liquid fuel) and transition to a vapour or gas as it moves towards the main injector 12 and glow plug 16 positioned therebetween. The glow plug 16 is positioned a distance represented by arrow 30 from the side injector 14. The distance 30 may be selected and/or the type of fuel injected from the side injector 14 may be selected so as to ensure that the first volume of fuel injected from the side injector 14 is in a vapour or gaseous form once it reaches the glow plug 16, within an operational temperature range of the internal combustion CI engine. As such, the glow plug 16 may be positioned relative to the side injector 14 such that the distance 30 between the glow plug 16 and side injector 14 is of a sufficient magnitude to permit the first volume of fuel to transition from a liquid to a vapour or gaseous phase (e.g. fully transition to a high degree e.g. >90% gaseous or vapour fraction) once it has reached the glow plug 16. In doing so, the glow plug 16 may only come into contact with the first fuel volume once it is in a gaseous or vapour form, and therefore the wear on the glow plug 16 may be reduced by avoiding or reducing contact with liquid fuel.

In the schematic illustration of FIG. 1, the ignition system and main injector 12 may be positioned inside the cylinder of a CI engine. Injection of a volume of fuel from the main injector 12 and the side injector 14 may be timed such that the surrounding gas is compressed, and may be at a predetermined pressure or pressure range that is sufficient to cause combustion of the volume of fuel in the ignition system. The compression ratio of the cylinder in the CI engine may be higher than that of a typical diesel engine, although in some examples, it may not be necessary to have a higher compression ratio.

In this example, a single ignition system is illustrated in combination with a main injector 12. However, in other examples, a single main injector 12 may comprise or be used in combination with a plurality of ignition systems. As such, there may be a plurality of side injectors 14 and corresponding glow plugs 16. Relative to an axis extending through the centre of the main injector 12 and parallel with the longitudinal axis of the combustion cylinder, a second ignition system may be rotated 180 degrees, for example. A plurality of ignition systems may be provided in a circumferential array around the main injector (e.g. the axis as described previously). The plurality of ignition systems may be evenly spaced about the main injector axis. For example, where there are 3 ignition systems, each ignition system may be provided spaced 120 degrees from each adjacent ignition system, where there are 4 ignition systems, the spacing may be 90 degrees, etc.

Illustrated as a plurality of lines 34 extending from the main injector 12, the method comprises injecting a second volume of fuel from at least one outlet 24 of the main injector 12. In this example, the main injector 12 comprises eight outlets 24, although as will be explained in further detail in the coming paragraphs, the main injector 12 may have more or fewer outlets 24. In this example, the main injector 12 has a substantially cylindrical shape, and the outlets 24 are distributed circumferentially on the main injector 12, for example circumferentially distributed around the periphery of the main injector 12. Here, the outlets are located on a lateral surface of the main injector 12 relative to the base **12*a* of the main injector 12. It should be noted that in other examples, the main injector 12 may have other shapes, such as an extruded oval shape, or a triangular or rectangular prism shape, or a cube shape, and the outlets 24 may be distributed around the periphery thereof, for example on a lateral surface relative to the base 12*a* of the main injector 12**.

Although in some examples, the outlets 24 may be configured to direct a volume of fuel in a direction perpendicular to the lateral surface of the main injector 12, the outlets 24 may be configured to direct a volume of fuel at an oblique angle relative to the lateral surface of the main injector 12. For example, the outlets 24 may direct fuel in a direction parallel to the surface 28 or may direct a volume of fuel at an angle below the parallel. In one example, the outlets 24 may be configured to direct a volume of fuel at around 15 degrees below the parallel, around degrees below parallel, such as at an angle of between 10 and 25 degrees below the parallel. In the example of FIG. 1, below is intended to mean in the direction away from the surface 28.

In order to provide a desired direction for a volume of fuel flowing therethrough, the outlets 24 of the main injector 12 (or also the outlet 26 of the side injector 14) may comprise a flow director arrangement (such as a nozzle or nozzle arrangement) which may be integrated into or adjacent the outlets 24, 26. In some examples, the lateral surface of the side injector 14 (or of the side injector 14) relative to the surface 28 may additionally or alternatively be sloped, so as to position the outlets 24, 26 at a desired angle relative to the surface 28.

The spacing of the outlets 24 of the main injector 12 may be uniform, as illustrated in FIG. 1 the spacing is uniform and circumferentially distributed. The outlets 24 may be evenly spaced on the main injector 12, as is shown in FIG. 1. In some examples, the outlets 24 may be arranged in groups, for example in a plurality (e.g. three or four) groups of two, three, four or the like, of outlets 24 that are spaced closer together relative to the other outlets 24.

As illustrated in the upper part of FIG. 1, the outlets 24 are positioned so as to direct the second volume of fuel away from the glow plug 16. The outlets 24 are positioned on the main injector 12 so as to provide a space 36 between each outlet 24, or each grouping of outlets. As illustrated in the upper portion of FIG. 1, the second volume of fuel is directed radially outwardly of each outlet 24. Radially outwardly of each space 36 is provided a sheltered region 38, which is located between the regions into which the second volume of fuel is directly injected as a liquid fuel.

The glow plug 16 may be positioned adjacent a space 36 between two outlets 24, or two groupings of outlets 24. The glow plug 16 may be positioned in a sheltered region 38. An intermediate sheltered region may be positioned between the main injector 12 and the side injector 14, and the glow plug 16 may be positioned in this intermediate sheltered region. Positioning the glow plug 16 in a sheltered region may assist to prevent or reduce the volume of liquid fuel being directed from the outlets 24 of the main injector 12 directly onto the glow plug 16, thereby reducing wear on the glow plug 16 as a result of fuel coming into contact therewith and avoiding the fuel from the outlets 24 being ignited directly by the glow plug, which may be useful e.g. in situations where a pre-injection of fuel from the main injector 12 is desired.

The outlets 24 may be equidistantly located on the lateral surface of the main injector 12, and therefore the sheltered regions 38 may be approximately equal in their circumferential length. However, in some examples the outlets 24 adjacent the intermediate sheltered region may be spaced further apart compared to the other spacings between outlets 24, thereby further reducing the likelihood that liquid fuel will contact the glow plug 16.

In this example, the glow plug 16 is located closer to the main injector 12 than to the side injector 14, which may assist to prevent or restrict liquid fuel being directed from main injector outlets 24 inadvertently coming into contact with the glow plug 16. Positioning the glow plug 16 further from the side injector 14 may assist to ensure that any fuel from the side injector has fully or substantially transitioned from a liquid fuel to a vapour or gas, and may also ensure that combustion of the fuel from the side injector 14 occurs close to the main injector 12, and in particular close to the centre of the main injector 12, thereby assisting to ignite fuel being directed from the outlets 24 of the main injector 12. Further, as liquid fuel being directed from the outlets 24 may tend to extend in a circumferential direction as well as a radial direction from the main injector 12 due to its momentum and that it is transitioning to a vapour or gas, the positioning of the glow plug 16 closer to the main injector 12 may assist to prevent or restrict fuel extending in a circumferential direction from the outlets 24 from contacting the glow plug 16.

Further illustrated is an intended combustion volume 40 of the side injector 14. As a volume of fuel is directed (e.g. flowed, injected, sprayed or the like) though either the main injector outlet 24 or the side injector outlet 26, the volume of fuel begins to transition from a liquid to a vapour or gas, and may spread from the initial trajectory of the liquid fuel. The glow plug 16 ignites the volume of fuel from the side injector 14, and the momentum of the fuel passing the glow plug 16 causes the majority of the fuel to ignite and expand in the volume surrounding the main injector 12. This combusted fuel is here illustrated by the combustion volume 40*a*. Smaller combustion volume 40*b* (which may be considered to be a pre-combustion volume) represents a smaller volume of fuel which may mainly be formed of non-combusted fuel, although at least some of which may ignite between the combustion volume 40*a* and the side injector 14 as a result of the flame from combustion volume 40*a* travelling back towards the side injector 14. There exists also an overlap between the flow mass from the side injector 14 and combustion volume 40*a*, and the flow mass from the main injector 12, thereby causing combustion of the main injector flow mass. As such, the glow plug 16 may be configured to ignite the volume of fuel from the side injector 14, subsequently causing combustion of the volume of fuel from the main injector 12. Although not illustrated, the flow mass from the main injector 12 may be configured to reach the lateral walls of the cylinder in which it is located, and therefore may provide combustion that reaches the lateral surface (e.g. the curved surface) of the cylinder.

Figure 2A:
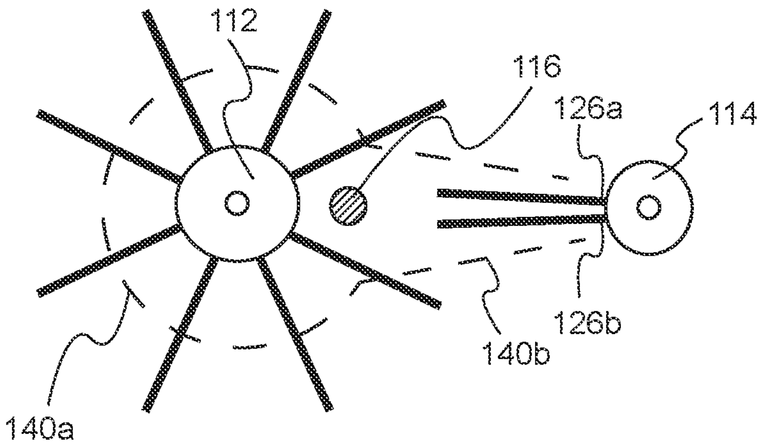
FIG. 2A and FIG. 2B are plan views of differing examples of a fuel injection and combustion system.

FIG. 2A illustrates a further example of a side injector 114. Many of the features illustrated in FIG. 2A are substantially similar to those illustrated in FIG. 1, and as such alike features are given alike reference numerals, augmented by 100. In this example, the configuration of the main injector 112, the glow plug 116 and the side injector 114 is the same as that of FIG. 1, with the exception that the side injector 114 comprises two side injector outlets 126*a*, 126*b*. Although in this example, two side injector outlets 126*a*, 126*b* are illustrated, it should be appreciated that three, four or more outlets may also be possible.

In line with FIG. 1, the side injector outlets 126*a*, 126*b* direct a volume of fuel towards both the main injector 112 and the glow plug 116, although in the case where there are a plurality of side injector outlets 126*a*, 126*b*, the outlets may have a horizontal alignment (e.g. be positioned next to one another) and direct a volume of fuel slightly offset from the centroid of the main injector 112 and/or the glow plug 116. In some examples, the plurality of side injector outlets 126*a*, 126*b* may have a vertical alignment (e.g. one may be positioned above another to align outlets parallel to the central axis of the combustion cylinder), and therefore in this example both may direct a volume of fuel directly towards the centroid of the main injector 112 and/or the glow plug 116. In having a plurality of side injector outlets 126*a*, 126*b*, the volume occupied by the smaller combustion volume 140*b* (or may be considered to be pre-combustion volume) may be increased, which may facilitate combustion of the fuel from the main injector 112, e.g. the fuel in the combustion volume 140*a*.

Figure 2B:
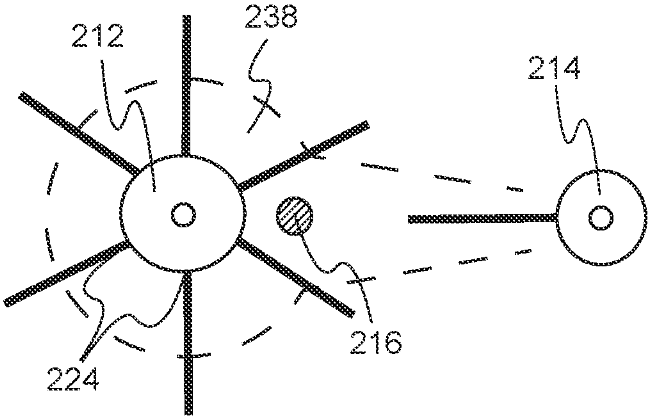

FIG. 2B illustrates a further example of a main injector 212. Many of the features illustrated in FIG. 2A are substantially similar to those illustrated in FIG. 1, and as such alike features are given alike reference numerals, augmented by 200. The main injector 212 comprises a plurality of main injector outlets 224, as with the previous FIGURES, however in this FIGURE the main injector 212 comprises six outlets 224, whereas previously the main injector 212 comprised eight outlets 24, 124.

As with the previous Figures, the outlets 224 are spaced around the periphery of the main injector 212—in this example, circumferentially spaced—such that a space exists between each of the outlets 224 and a sheltered region 238 is located between the regions into which a volume of liquid fuel is injected from the main injector outlets 224. As with the previous FIGURES, the glow plug 216 is located in a sheltered region 238, thereby reducing the wear on the glow plug by preventing or reducing the likelihood that it will come into contact with liquid fuel, and preventing direct combustion between of the fuel from the main injector 12 and the glow plug 16.

The fuel used in the method for injecting and combusting fuel may be, for example, an alternative fuel. An alternative fuel may be one that is not widely available to consumers and/or widely available in internal combustion engines (e.g. natural gas (such as CNG, LNG or methane), hydrogen, ammonia, or alcohols such as methanol, ethanol, octanol or the like). The fuel used may be a fuel with an auto-ignition temperature of above 300 degrees Celsius. Non-alternative fuels may be considered as petrol (e.g. as used in a spark ignition engine) and diesel, which are widely available to consumers, and widely used as fuel for vehicles.

FIGS. 3A to 3D illustrate examples of fuel injection sequences that may be possible with the injection and combustion system of the previous Figures. In FIGS. 3A to 3D, the horizontal axis 50 represents time (e.g. in seconds, milliseconds, or the like), while the vertical axis 52 represents an injector of the injection and combustion system. Here, a first lower point 54 on the vertical axis 52 indicates the status of the main injector 12, 112, 212 (e.g. injecting or not injecting), while a second upper point 56 on the vertical axis 52 indicates the status of the side injector 14, 114, 214 (e.g. injecting or not injecting). As such, the illustrated graphs permit a comparison between the injection of the main injector 12, 112, 212 compared to that of the side injector 14, 114, 214.

Figure 3A:
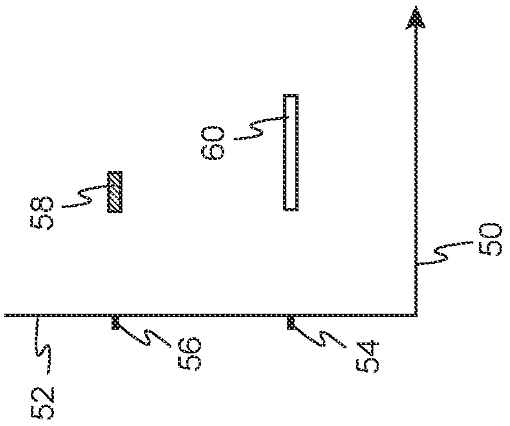

FIG. 3A represents a standard injection sequence for injection and combustion. Here, both the main injector 12 and the side injector 14 begin injection at approximately the same time point, or substantially the same time point. The side injector 14 injects fuel continuously for a shorter time period than the main injector 12 in this example. For example, the main injector 12 may continuously inject fuel for two or more times the time period than the side injector 14 (e.g. three times, four times, five times or the like). The side injector 14 may be configured to inject fuel, for example, until the fuel from the side injector 14 and the main injector 12 is ignited, or at least until the fuel from the main injector 12 and the side injector 14 is ignited. FIG. 3A illustrates the side injector 14 injecting a first volume of fuel 58, and the main injector 12 injecting a second volume of fuel 60. It should be noted that the notation "first" and "second" when referring to the volumes of fuel is simply used to distinguish one volume of fuel from another, and is not intended to provide information on the sequence in which the first and second volumes of fuel are injected. While the first fuel volume 58 may be injected before the second fuel volume 60, equally may the second fuel volume 60 be injected before the first fuel volume 58 or, as is illustrated in FIG. 3A, the first and second fuel volumes 58, 60 may be injected simultaneously.

Figure 3B:
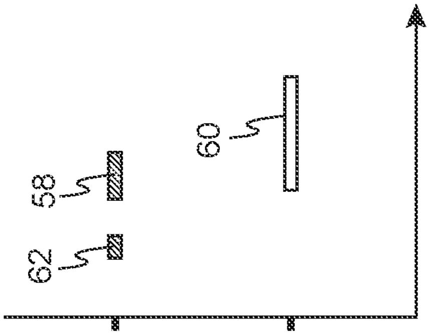

In FIG. 3B, there is illustrated an injection sequence in which a pre-injection fuel volume 62 is injected from the side injector 14 before the first fuel volume 58. The pre-injection fuel volume 62 is also, in this example, injected before the second fuel volume 60 from the main injector 12. When injecting a pre-injection fuel volume 62, the pre-injection fuel volume 62 ignites and may combust fully or substantially fully before injection of the first fuel volume 58. Combustion of the pre-injection fuel volume 62 may have the effect of raising the temperature of the gas (e.g. air) in the illustrated combustion chamber, thereby facilitating subsequent combustion of the first and second fuel volumes 58, 60.

Figure 3C:
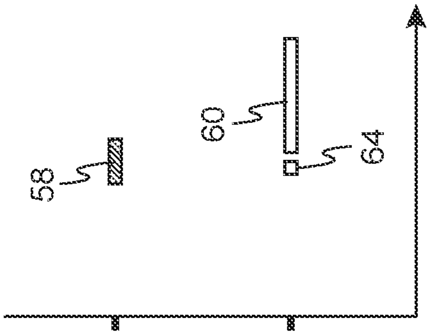

FIG. 3C illustrates an injection sequence in which a pre-injection fuel volume 64 from the main injector 12 is injected before the second volume of fuel 60 from the main injector 12 is injected. The pre-injection fuel volume 64 may be in the form of a pulse. The pre-injection fuel volume 64 may be injected for a shorter period of time as compared to the first and second injection volumes 58, 60. The pre-injection fuel volume 64 may be injected at the same time as the first flow volume 58 is injected from the side injector 14. The pre-injection fuel volume 64 may mix with surrounding air or gas before combustion, and combustion of the pre-injection fuel volume 64 may be at the same time as the second fuel volume 60. Having a pre-injection fuel volume 64 from the main injector 12 may permit combustion of the fuel through the entire circumference and radius of the combustion volume 40*a* (see FIG. 1) may be achieved before injection of the second fuel volume 60, thereby assisting to provide a more uniform combustion of the second fuel volume.

A further possible injection sequence may involve having both a pre-injection fuel volume 62 from the side injector 14 and a pre-injection fuel volume 64 from the main injector 12. The pre-injection fuel volume 62 may be injected from the side injector 14 prior to the pre-injection fuel volume 64 being injected from the main injector 12. The pre-injection fuel volume 62 from the side injector 14 may be ignited before the pre-injection fuel volume 6 is injected from the main injector 12. The residual heat from the combustion of the pre-injection fuel volume 62 may ignite the pre-injection fuel volume 64, thereby creating further residual heat around the ignition system (of the glow plug 16 and the side injector 14) and the main injector 12 to facilitate further combustion of the first and second fuel volumes 58, 60.

Figure 3D:
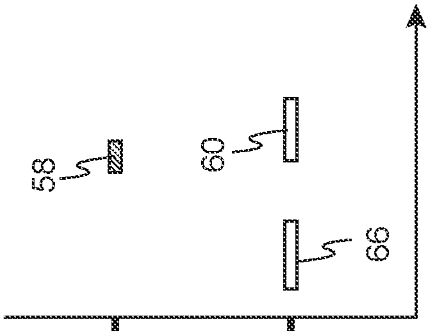

FIG. 3D illustrates a third fuel volume 66 that may be injected before the first and second fuel volumes 58, 60. The third fuel volume 66 may be or comprise a volume of partially premixed fuel that is permitted to mix with gas (e.g. air in the combustion cylinder) before combustion. By injecting the third fuel volume 66 before the injection of the first fuel volume 58 and the second fuel volume 60, the third fuel volume 66 may be permitted to mix with the air/gas surrounding the main injector 12 before combustion of the first fuel volume 58 (e.g. mix with the surrounding air/gas for a longer time period than the second fuel volume before combustion), thereby providing a mass of partially premixed fuel for combustion which may assist to improve the emissions of the injection and combustion system. The injection sequence of FIG. 3D may correspond to a sequence that may be desirable after startup of an engine comprising the injection and combustion system, for example shortly after startup of such an engine. This fuel sequence involving partially premixed fuel may provide preferable (e.g. lower) levels of undesirable emissions as compared to a fuel sequence in which partially premixed fuel was not used, and these emissions may be particularly high at startup where the engine may be cold. Once the engine is no longer in the startup period, there may be enough residual heat in the vicinity of the main injector 12 such that combustion of the third fuel volume 66 (which may be a partially premixed fuel volume) is possible without having to provide any fuel from the side injector 14.

The person skilled in the art realises that the present disclosure is not limited to the preferred embodiments described above. The person skilled in the art further realises that modifications and variations are possible within the scope of the appended claims. For example, as described the number of outlets from the main and side injectors may be varied, the injection sequences may be varied, or the like. Additionally, variations to the disclosed embodiments can be understood and effected by the skilled person in practicing the claimed disclosure, from a study of the drawings, the disclosure, and the appended claims.

The invention claimed is:

1. A fuel injection and combustion system in an internal combustion engine, comprising:

- a main injector comprising at least one main injector outlet configurable to direct a volume of fuel therethrough;
- a side injector comprising a side injector outlet configurable to direct a volume of fuel therethrough and in a direction towards the main injector, wherein the side injector is configurable to direct a volume of fuel at a centroid of the main injector; and
- a glow plug positioned between the main injector and the side injector outlet and configurable to provide an increase in temperature so as to ignite a volume of fuel from the side injector outlet and subsequently a volume of fuel from the at least one main injector outlet.

2. The fuel injection and combustion system of claim 1, wherein the glow plug is positioned between the main injector and side injector outlet such that the side injector is configurable to direct a volume of fuel directly towards both the main injector and the glow plug.

3. The fuel injection and combustion system of claim 1, wherein a flow axis extends between a centroid of the side injector and the centroid of the main injector, and the flow axis intersects the glow plug.

4. The fuel injection and combustion system of claim 1, wherein the at least one main injector outlet is configurable to direct a volume of fuel away from the glow plug, such that the glow plug is located outside of the volume of fuel.

5. The fuel injection and combustion system of claim 1, wherein the glow plug is located closer to the main injector than the side injector.

6. The fuel injection and combustion system of claim 1, wherein the side injector comprises a plurality of side injector outlets, each configurable to direct a volume of fuel therethrough in the direction towards the main injector.

7. The fuel injection and combustion system of claim 1, wherein the fuel injected from the main injector and the side injector is the same type of fuel.

8. The fuel injection and combustion system of claim 1, wherein the fuel injected from the main injector and the side injector is one of a natural gas, hydrogen, ammonia, or an alcohol.

9. The fuel injection and combustion system of claim 1, wherein the fuel injected from the main injector and the side injector has an auto-ignition temperature of above 300 degrees Celsius.

10. The fuel injection and combustion system of claim 1, wherein the side injector is configurable to direct a volume of fuel therethrough to form a side injector flow mass, and the main injector is configurable to direct a volume of fuel therethrough to form a main injector flow mass.

11. The fuel injection and combustion system of claim 10, wherein the side injector flow mass and the main injector flow mass at least partially, or fully, overlap.

12. A method for injecting and combusting fuel in an internal combustion engine, comprising:

injecting a first volume of fuel from an outlet of a side injector in a direction of a main injector, wherein the side injector is configurable to direct a volume of fuel at a centroid of the main injector;

injecting a second volume of fuel from at least one outlet of the main injector;

providing an increase in temperature of a glow plug positioned between the side injector and the main injector; and igniting the first volume of fuel and subsequently igniting the second volume of fuel.

13. The method of claim 12, comprising injecting the second volume of fuel from the at least one outlet of the main injector in a direction away from the glow plug so as to avoid contact between the glow plug and the second volume of fuel, and to avoid directly igniting the second volume of fuel by the glow plug.

14. The method of claim 12, comprising injecting a pre-injection fuel volume from the side injector prior to injecting the first volume of fuel therefrom.

15. The method of claim 14, comprising igniting the pre-injection fuel volume prior to injecting the first volume of fuel therefrom, and prior to injecting the second volume of fuel from the main injector.

16. The method of claim 12, comprising injecting a pre-injection fuel volume from the main injector prior to injecting the second volume therefrom.

17. The method of claim 16, comprising injecting the pre-injection fuel volume from the main injector after igniting the pre-injection fuel volume from the side injector, such that the pre-injection fuel volume from the main injector is ignited by residual heat from the ignited pre-injection fuel volume from the side injector.

18. The method of claim 12, comprising injecting a third fuel volume from the main injector, and igniting the third fuel volume.

19. The method of claim 12, comprising injecting the first volume of fuel in a direction of both the main injector and the glow plug positioned therebetween, such that the first volume of fuel is ignited by the glow plug and reaches the main injector in a form of ignited fuel.

* * * * *